W. J. LAUGHLIN.
AUTOMOBILE STEERING DEVICE.
APPLICATION FILED JUNE 3, 1915.
1,223,988.
Patented Apr. 24, 1917.
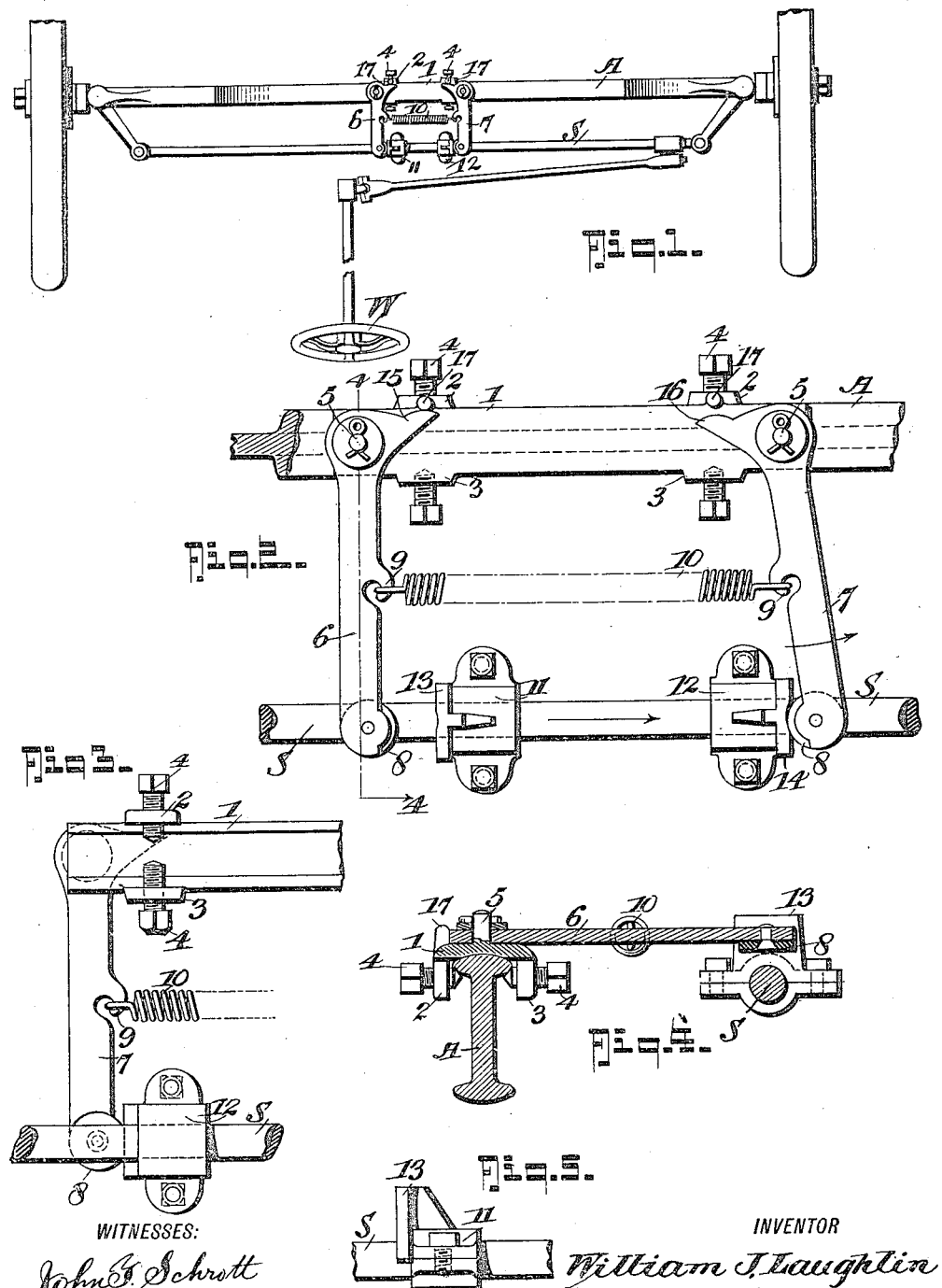
WITNESSES:
John F. Schrott
H. E. Beck
INVENTOR
William J. Laughlin
BY Munn & Co.
ATTORNEYS

UNITED STATES PATENT OFFICE.

WILLIAM J. LAUGHLIN, OF BELOIT, WISCONSIN.

AUTOMOBILE STEERING DEVICE.

1,223,988.            Specification of Letters Patent.      Patented Apr. 24, 1917.

Application filed June 3, 1915. Serial No. 31,872.

*To all whom it may concern:*

Be it known that I, WILLIAM J. LAUGHLIN, a citizen of the United States, and a resident of Beloit, in the county of Rock and State of Wisconsin, have invented a new and useful Improvement in Automobile Steering Devices, of which the following is a specification.

The object of my invention is to provide a device connectible between the front axle and the steering rod of an automobile which embodies such means whereby the machine will be kept in a straight-away course without the particular attention of the driver of the vehicle.

To attain this object, a pair of rearwardly extending arms are pivoted to the front axle of the machine and engaged with suitably arranged stops on the steering rod, the arms being held in parallelism and against the aforesaid stop by an intervening spring, this spring tending to normally hold the arms and steering rod in right angular relationship so as to steer the automobile directly ahead until the driver desires to change the course. When this occurs, one of the stops forces the corresponding arm out of parallelism thus storing a tension in the spring which will assist the operator to return the machine to its straight-away course.

The application and use of my invention is fully described, specifically pointed out in the appended claims and illustrated in the accompanying drawing in which—

Figure 1 is a plan view, so much of the steering gear of an automobile being shown as is necessary to illustrate the application of my invention the adjustment of the parts being for travel on a straight-away course.

Fig. 2 is an enlarged plan view of the device showing the position of the parts when the machine is turned out of its straight-away course.

Fig. 3 is an inverted plan view of one end of the device.

Fig. 4 is a section on line 4—4 of Fig. 2.

Fig. 5 is a detail elevation of one of the steering rod carried stops.

In the practical application of my invention it is adapted to be mounted upon the front axle A and combined with the steering rod S of an automobile in such a way that the vehicle will be held in a straight course and not be permitted to suddenly turn should the driver release his grasp on the steering wheel W, for any reason.

By reference to Figs. 1 and 4 of the drawing it will be seen that the device comprises a plate 1 which has a pair of downwardly projecting lugs 2 on its front edge such lugs 2 coöperating with a pair of similarly downwardly directed lugs 3, on the rear edge of the plate 1. Lugs 2 and 3 are screw-threaded to admit clamp-screws 4 so that when the lugs 2 and screws 4 are locked under the head of the channeled front axle A at the front side, the screws 4 may be tightened against the opposite side of the axle and thus fixedly secure the plate 1 to the axle A.

Cast integrally with the plate 1 at its longitudinal extremities, are pivot studs 5 on which are mounted rearwardly extending arms 6 and 7 said arms being retained on the pivot studs 5 by suitable washers and cotter-pins.

Pivoted at the rear end of the levers 6 and 7 and on the under-side thereof, are friction rollers 8 while integrally formed hooks 9 are arranged on the arms 6 and 7, midway of the pivots 5 and rollers 8 on which the ends of a strong coil spring 10 are caught.

Coöperating with the friction rollers 8 of the arms 6 and 7 and clamped onto the steering rod S are stops 11 and 12, which stops and friction rollers 8 are adapted to remain in frictional engagement; to this end they are made in two parts and joined by bolts so that when the bolts are loosened the stops may be shifted along the rod S until the upstanding friction plates 13 and 14 engage the rollers 8 when the arms 6 and 7 are in their normal or right-angular relationship with the axle A, and then tightly clamped into position.

Extending diagonally from the arms 6 and 7 and cast integrally therewith, are heels 15 and 16 which, when the steering gear is in its normal position as in Fig. 1, engage studs 17 of the base plate 1, thereby limiting the inward swing of the arms 6 and 7 through the action of the connecting spring 10.

By the arrangement described and shown it will be apparent that the function of the coil spring 10 is to keep the arms 6 and 7 in parallelism and normally at right angles with the front axle A of the automobile and when this is accomplished both stops 11 and 12 will have been brought to their normal resting place and consequently the steering rod will thereby have been centered to cause the vehicle to move along a straight-away course independently of the efforts of the driver.

Now should the driver wish to steer the machine to the left of a straight course, the steering rod S is moved toward the right as shown in Fig. 2. When this occurs stops 11 and 12 are moved laterally in the direction of the arrow, stop 12 forcing arm 7 over against the tension of the coil spring 10 while arm 6 by reason of the engagement of its heel 15 with the stud 17 remains stationary and at right angles with the axle A of the machine.

When the desired turn of the vehicle has been made the stored tension in the spring 10 will assist the driver in restoring the steering gear to its former and normal position so that a straight-away course may again be traversed. Should the car be turned toward the right, a similar operation will take place but in this instance, arm 6 and stop 11 perform the active function while the relative performances of arm 7 and stop 12 are passive.

Obviously variations and modifications can be made in the specific embodiment of the invention shown and described without departing from the spirit thereof as set forth in the accompanying claims.

I claim:—

1. In combination with the front axle and steering rod of an automobile, a bearing plate secured to the front axle, an arm pivoted at each end of the plate and extending toward the steering rod, an abutment arranged on the said plate adjacent the pivot of each arm, stops on the steering rod, each stop being frictionally engaged by the end of the lever which it adjoins each of the stops being capable of independent adjustment for wear, and a retractile spring interposed between the arms and secured to each arm midway of the arm pivots and the arm stops.

2. In combination with the front axle and steering rod of an automobile, a bearing plate having suitable means whereby it may be fixedly clamped to the front axle, bearing lugs and abutment lugs arranged at both ends of the bearing plate, a pair of arms pivoted on the bearing lugs and extending rearwardly toward the steering rod, heels provided on the arms adjacent their pivoted connection with the bearing plate to engage the aforesaid abutment lugs, a coil spring interposed and connected between the rearwardly extending arms to maintain contact of the before mentioned heels with the abutment lugs under normal conditions, friction rollers pivoted at the rear extremity of the arms and adjoining the steering rod, and lugs fastened on said steering rod and adjusted to engage the aforesaid friction rollers whereby the steering rod will constantly be urged to a predetermined central and normal position under influence of the coil spring so that the vehicle may maintain a straight course without effort by the driver.

3. In combination with the front axle and steering rod of an automobile, a transverse bridge plate having downwardly turned lugs on its front edge and downwardly turned lugs on its rear edge the said lugs being tapped to admit clamp-screws whereby the bridge plate may be fixedly clamped onto the front axle, bearing lugs and abutment lugs provided at the longitudinal extremities of the bridge plate, an arm pivoted on each of the bearing lugs and extending rearwardly to a place adjacent the steering rod, friction rollers pivoted on the underside of the rear ends of the aforesaid arms, and heels provided on the opposite ends of the arms extending laterally to a point of engagement with the aforementioned abutment lugs, hooks provided on each of the rearwardly extending arms at a point midway of their length, stops adjustably clamped onto the steering rod, and a coiled tension spring fastened onto the aforementioned hooks and spanning the space between the rearwardly extending arms whereby to normally maintain the aforementioned heels and abutment lugs in contact and to urge the steering rod to its central and pre-determined normal position to insure the straight away travel of the vehicle.

4. In a device of the character described, a bridge plate adapted to be clamped onto the front axle of an automobile, abutment lugs and pivot lugs cast integrally with the bridge plate at its longitudinal extremities, rearwardly extending arms mounted on the pivot lugs and having integral heels adjacent the pivotal connection of the arms with the bridge plate whereby to limit the movement of the arms, in one direction, friction rollers pivoted to the rear ends of the aforesaid rearwardly extending arms adapted to frictionally engage suitable stops on the adjoining steering rod of the automobile and a spring device arranged between the aforesaid arms to maintain a predetermined angular position of the rearwardly extending arms under normal conditions and to return the steering rod to its central and normal position should it be shifted to turn the vehicle out of a straight-away course.

WILLIAM J. LAUGHLIN.

Witnesses:
C. G. ALLING,
J. B. ESTES.

Copies of this patent may be obtained for five cents each, by addressing the "Commissioner of Patents, Washington, D. C."